United States Patent
Koh et al.

(10) Patent No.: US 11,230,848 B2
(45) Date of Patent: Jan. 25, 2022

(54) ANTI-TRANSFER FLOOR TILE AND METHOD FOR MANUFACTURING SAME

(71) Applicant: NOX CORPORATION, Chungcheongnam-do (KR)

(72) Inventors: Dong Hwan Koh, Seoul (KR); Woon Kyu Jang, Cheonan-si (KR); Young Dae Song, Dangjin-si (KR); Kyung Tae Ha, Seoul (KR); Woo Jin Kim, Daejeon (KR)

(73) Assignee: NOX CORPORATION, Chungcheon (KR)

( * ) Notice: Subject to any disclaimer, the term of this patent is extended or adjusted under 35 U.S.C. 154(b) by 0 days.

(21) Appl. No.: 16/768,784

(22) PCT Filed: Nov. 29, 2018

(86) PCT No.: PCT/KR2018/014967
§ 371 (c)(1),
(2) Date: Nov. 17, 2020

(87) PCT Pub. No.: WO2019/107970
PCT Pub. Date: Jun. 6, 2019

(65) Prior Publication Data
US 2021/0172179 A1   Jun. 10, 2021

(30) Foreign Application Priority Data
Dec. 1, 2017   (KR) .................. 10-2017-0164557

(51) Int. Cl.
*B32B 7/04*   (2019.01)
*E04F 15/10*   (2006.01)
*B32B 7/022*   (2019.01)
*B32B 27/08*   (2006.01)
*B32B 27/20*   (2006.01)
*B32B 27/22*   (2006.01)

(52) U.S. Cl.
CPC ............ *E04F 15/107* (2013.01); *B32B 7/022* (2019.01); *B32B 7/04* (2013.01); *B32B 27/08* (2013.01); *B32B 27/20* (2013.01); *B32B 27/22* (2013.01); *B32B 2250/03* (2013.01); *B32B 2250/04* (2013.01); *B32B 2250/05* (2013.01); *B32B 2307/536* (2013.01); *B32B 2471/00* (2013.01)

(58) Field of Classification Search
CPC ............ B32B 2250/03; B32B 2250/04; B32B 2250/05; B32B 2307/536; B32B 2471/00; B32B 27/08; B32B 27/20; B32B 27/22; B32B 37/02; B32B 7/022; B32B 7/04; E04F 15/107
See application file for complete search history.

(56) References Cited

FOREIGN PATENT DOCUMENTS

| | | |
|---|---|---|
| JP | 2015-004042 A | 1/2015 |
| KR | 10-0645184 A | 11/2006 |
| KR | 10-2009-0005529 A | 1/2009 |
| KR | 10-2016-0027660 A | 3/2016 |
| KR | 10-2018-0018342 A | 2/2018 |

OTHER PUBLICATIONS

International Search Report dated Mar. 23, 2019 issued in PCT/KR2018/014967.

*Primary Examiner* — Lawrence D Ferguson
(74) *Attorney, Agent, or Firm* — Scully, Scott, Murphy & Presser, P.C.

(57) ABSTRACT

The present invention provides an anti-transfer floor tile including a high hardness layer and a method for manufacturing the same.

10 Claims, 6 Drawing Sheets

| Upper layer |
|---|
| Printed layer |
| Intermediate layer |
| High hardness layer |
| Dimension stabilization layer |
| Lower layer |

| Upper layer |
|---|
| Printed layer |
| Intermediate layer |
| Dimension stabilization layer |
| High hardness layer |
| Lower layer |

FIG. 3a

| Upper layer |
|---|
| Printed layer |
| Intermediate layer |
| High hardness layer |
| Lower layer |

FIG. 3b

| Upper layer |
|---|
| Printed layer |
| High hardness layer |
| Intermediate layer |
| Lower layer |

FIG. 4a

| Upper layer |
|---|
| Printed layer |
| Intermediate layer |
| High hardness layer |
| Dimension stabilization layer |
| Lower layer |

FIG. 4b

| Upper layer |
|---|
| Printed layer |
| Intermediate layer |
| Dimension stabilization layer |
| High hardness layer |
| Lower layer |

FIG. 4c

| Upper layer |
|---|
| Printed layer |
| High hardness layer |
| Intermediate layer |
| Dimension stabilization layer |
| Lower layer |

FIG. 5a

| Upper layer |
|---|
| Printed layer |
| Intermediate layer |
| High hardness layer |
| Intermediate-lower layer |
| Lower layer |

FIG. 5b

| Upper layer |
|---|
| Printed layer |
| Intermediate layer |
| Intermediate-lower layer |
| High hardness layer |
| Lower layer |

FIG. 5c

| Upper layer |
|---|
| Printed layer |
| High hardness layer |
| Intermediate layer |
| Intermediate-lower layer |
| Lower layer |

FIG. 6a

| Upper layer |
|---|
| Printed layer |
| Intermediate layer |
| High hardness layer |
| Dimension stabilization layer |
| Intermediate-lower layer |
| Lower layer |

FIG. 6b

| Upper layer |
|---|
| Printed layer |
| Intermediate layer |
| Dimension stabilization layer |
| High hardness layer |
| Intermediate-lower layer |
| Lower layer |

FIG. 6c

| Upper layer |
|---|
| Printed layer |
| Intermediate layer |
| Dimension stabilization layer |
| Intermediate-lower layer |
| High hardness layer |
| Lower layer |

FIG. 6d

| Upper layer |
|---|
| Printed layer |
| High hardness layer |
| Intermediate layer |
| Dimension stabilization layer |
| Intermediate-lower layer |
| Lower layer |

ANTI-TRANSFER FLOOR TILE AND METHOD FOR MANUFACTURING SAME

TECHNICAL FIELD

The present invention relates to an anti-transfer floor tile without a surface transfer phenomenon and a method for manufacturing the same.

BACKGROUND ART

In the case of general flooring materials, especially floor tiles such as luxury vinyl tile (LVT), problems arise in that if there are irregularities or debris on a floor surface of a building structure, due to the manufacturing process and product characteristics, stains such as irregularities or debris of the floor surface are transferred to a surface of the floor tiles after applying the floor tiles.

In order to address such an issue, a method of firstly applying an underfloor (or underlayer), which is a formed or non-formed material, over the floor surface, and then laying floor tiles thereon has been suggested. However, this method involves two-stage construction, leading to a problem of increased work time and labor costs, and there is a limitation that this method cannot be applied to products using adhesives or loose-lay products because it is only applicable to non-adhesive products such as products to be, for example, interlocked.

In addition, in the registered utility model No. 20-0263231, a technique for preventing the surface transfer phenomenon caused by foreign substances present on the floor by artificially forming a recess on a bottom surface of a flooring material so that the flooring material floats away from the floor surface is proposed. However, even though the recess is imparted according to the afore-mentioned technique, when a lower portion of the flooring material has a low hardness and is hence soft, there is a problem in that the flooring material may closely contact the floor after long-term use, and the irregularities or curvature of the floor surface is transferred to the surface.

In addition, a method of forming a foam layer at a bottom portion of the flooring material to accommodate the irregularities of the floor surface has been proposed to solve the surface transfer problem, but when a foam magnification is increased to enhance the absorption capacity for the floor irregularities, residual indentation and restoring force may be lowered and when a surface is pressed, the pressed portion may be indented to cause defects on appearance.

In order to improve this, Korean Patent Laid-open Publication No. 2017-0063012 proposed a technique of using two or more foam layers having different expansion ratios or expansion materials, but in such case, there have also been problems in that an adhesive is used or an additional adhesive process is added to bond different layers to each other, thus increasing the cost, and that the process becomes complicated as each layer is individually manufactured, requiring a separate facility.

DISCLOSURE

Technical Problem

Aspects of embodiments of the present invention are to provide a floor tile having excellent dimensional stability, curing properties, residual indentation against pressing, and strength, without problems of irregularities and foreign substances on a floor surface being transferred to a tile surface, and to a method of manufacturing the floor tile.

Further aspects of embodiments of the present invention are to provide an eco-friendly floor tile by using no adhesive, minimizing the use of plasticizer, and simplifying the process in interlayer bonding of the tile, and to a method of manufacturing the floor tile.

Technical Solution

An embodiment of the present disclosure provides:

an anti-transfer floor tile, comprising: a printed layer, a high hardness layer, and a lower layer, wherein the high hardness layer includes at least one polymer resin selected from the group consisting of: polyethylene resin, polypropylene resin, ABS resin, polyvinyl chloride resin, acrylic resin, polyester resin, polystyrene resin, polytetrafluoroethylene, ethylene-vinyl acetate copolymer, ethylene propylene copolymer, thermoplastic polyurethane (TPU), the high hardness layer comprises a plasticizer in an amount ranging from 5 to 20 phr and a filler in an amount ranging from 50 to 300 phr, the high hardness layer has a plasticizer and filler content ratio (plasticizer:filler) in a range from 0.02 to 0.4:1 by weight, and a specific gravity of the high hardness layer is in a range from 1.5 to 2.5.

Another embodiment of the present disclosure provides:

a method of manufacturing the anti-transfer floor tile, the method comprising:

(a) preparing a printed layer and a lower layer, (b) forming a high hardness layer in the form of a sheet, and then sequentially laminating the lower layer below the sheet and the printed layer on the sheet.

Advantageous Effects

According to the present disclosure, a floor tile that has a high mechanical strength and excellent dimensional stability and anti-curling properties (curling stability), without surface transfer phenomenon, by including a high hardness layer, may be provided.

According to the present disclosure, by virtue of the excellent dimensional stability of the floor tile, a gap may not be generated between tiles after construction, and hence contamination is suppressed, and the ease of cleaning is improved.

According to the present disclosure, it is possible to provide excellent interlayer bonding force and production efficiency, since layers, each produced using a calendering scheme, are sequentially or concurrently integrated by heat fusion in a lamination process.

According to the present disclosure, an eco-friendly floor tile may be provided, since the use of plasticizer is minimized and no adhesive is used.

In addition, according to the present disclosure, the process may be simplified and the manufacturing costs may be largely reduced by employing a heat fusion scheme, as compared to a bonding and pressing method, contamination of a tile surface due to excessive use of adhesive and contamination due to migration of the adhesive from a lower layer to a surface layer may be prevented, thus reducing defects on appearance, and eco-friendliness may be provided by significantly lowering the concentration of total volatile organic compounds (TVOC) that may be generated in the tile.

DESCRIPTION OF DRAWINGS

FIGS. 3A and 3B illustrate a floor tile according to another embodiment of the present disclosure, where an upper layer and an intermediate layer are additionally included in the floor tile of FIG. 1.

FIGS. 4A to 4C illustrate a floor tile according to another embodiment of the present disclosure, where an upper layer, an intermediate layer, and a dimension stabilization layer are additionally included in the floor tile of FIG. 1.

FIGS. 5A to 5C illustrate a floor tile according to another embodiment of the present disclosure, where an upper layer, an intermediate layer, and an intermediate-lower layer are additionally included in the floor tile of FIG. 1.

FIGS. 6A to 6D illustrate a floor tile according to another embodiment of the present disclosure, wherein an upper layer, an intermediate layer, a dimension stabilization layer, and an intermediate-lower layer are additionally included in the floor tile of FIG. 1.

MODE FOR INVENTION

Figure 1:
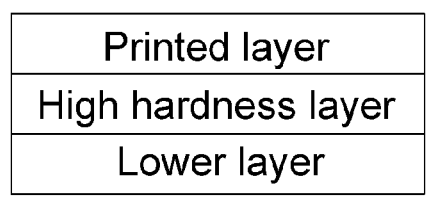
FIG. 1 illustrates a floor tile of a multi-layer structure according to an embodiment of the present disclosure.

Hereinafter, a floor tile according to embodiments of the present disclosure will be described with reference to accompanying drawings.

In the drawings, the thickness or size of each layer is exaggerated for convenience of description and clarity, and like reference numerals refer to like elements in the drawings. As used herein, the term "and/or" includes all combinations of any or one or more of the listed items.

The terms used herein are to describe specific embodiments and are not intended to limit the present disclosure. As used herein, singular forms may include plural forms unless the context clearly indicates otherwise. In addition, as used herein, "comprise" and/or "comprising" specifies the presence of the described shapes, numbers, steps, actions, members, elements and/or these groups and does not exclude the presence or addition of one or more of other shapes, numbers, actions, members, elements and/or groups.

In the present disclosure, a tile may be used as a construction material, for example, a wall material or a flooring material. It may be used as a wall or flooring material for offices and houses, especially as a flooring material.

ASPECT OF THE PRESENT DISCLOSURE

A floor tile according to an embodiment of the present disclosure includes a high hardness layer. In such an embodiment, the high hardness layer may be laminated below a printed layer and a lower layer may be famed below the high hardness layer (see FIG. 1).

Hereinafter, each layer constituting the tile will be described.

<Printed Layer>

In an embodiment of the present disclosure, the printed layer may include a polymer resin, a filler and an additive. Various designs and materials may be used for the printed layer, thereby providing a visual effect. For example, a printed paper, veneer, stone, bead, and the like may be used.

The printed layer includes at least one polymer resin selected from the group consisting of: polyethylene resin, polypropylene resin, ABS resin, polyvinyl chloride resin, acrylic resin, polyester resin, polystyrene resin, polytetrafluoroethylene, ethylene-vinyl acetate copolymer, ethylene propylene copolymer, and thermoplastic polyurethane (TPU).

The filler includes at least one selected from the group consisting of: calcium carbonate, silica, alumina, sepiolite, talc, antimony oxide, aluminum oxide, fly ash, barium sulfate and blast furnace slag.

The additive includes at least one selected from the group consisting of: plasticizers, stabilizers, pigments and flame retardants.

A thickness of the printed layer is in a range from 0.05 to 0.25 mm, and preferably 0.07 to 0.15 mm. If the thickness is less than 0.05 mm, the covering ability may be lowered and color of an underlying layer may be recognized. If it exceeds 0.25 mm, the economic efficiency is poor.

<High Hardness Layer>

The high hardness layer is a layer capable of preventing surface transfer phenomenon, in which foreign substances or irregularities on a floor surface may be transferred to a surface of a flooring material, and providing effects of improved physical properties such as excellent mechanical strength, dimensional stability, and curling properties (curling stability).

The high hardness layer of the present disclosure increases its strength by including a reduced amount of plasticizer, while providing the product eco-friendliness by containing less volatile organic substances. Accordingly, the tile including the high hardness layer of the present disclosure is characterized by being eco-friendly, light-weighted and high in strength compared to conventional building materials.

The high hardness layer includes at least one polymer resin selected from the group consisting of: polyethylene resin, polypropylene resin, ABS resin, polyvinyl chloride resin, acrylic resin, polyester resin, polystyrene resin, polytetrafluoroethylene, ethylene-vinyl acetate copolymer, ethylene propylene copolymer, and thermoplastic polyurethane (TPU). Preferably, as a polyester resin, polyvinyl chloride (PVC) resin or polyethylene terephthalate (PET) is used. Most preferably, a polyvinyl chloride resin is used.

When a polyvinyl chloride resin is used for the high hardness layer, a polymerization degree is preferably in a range from 700 to 2000. If the polymerization degree is lower than the above range, a problem rises in that mechanical properties are inferior. If it exceeds the above range, a problem rises in that a processing temperature increases, that is, the processability is diminished. It is more preferable that the polymerization degree is in a range from 800 to 1300.

Preferably, the high hardness layer includes the plasticizer in an amount ranging from 5 to 20 phr and the filler in an amount ranging from 50 to 300 phr. The high hardness layer employs a hard material, so that the product itself is hard and firm, thereby providing rigidity to the product itself. The high hardness layer has a high mechanical strength, is excellent in resistance against dimensional defamation, and thus may have excellent dimensional stability and minimize curling. By minimizing the dimensional defamation, a gap may not be generated between the tiles, for example, the flooring materials, thereby reducing the occurrence of contamination and securing the ease of cleaning. In the case of a building material including such a high hardness layer, for example, a flooring material, it provides a film and sturdy feeling like wood.

The filler includes at least one selected from the group consisting of: calcium carbonate, silica, alumina, sepiolite, talc, antimony oxide, aluminum oxide, fly ash, barium sulfate and blast furnace slag.

Contents of the plasticizer and the filler may vary depending on the hardness and the content of each component.

A specific gravity of the high hardness layer is preferably in a range from 1.5 to 2.5. If the specific gravity is less than 1.5, product defects may occur due to an increase in the process load, and if the specific gravity exceeds 2.5, a bonding force between raw materials may be lowered, resulting in product defects.

The high hardness layer may be provided below the printed layer, below an intermediate layer, below an intermediate-lower layer, and below a dimension reinforcement layer (GF layer).

The thickness of the high hardness layer may be adjusted according to the thickness of other layers, desired purpose, properties, and the like.

The high hardness layer may further include at least one additive selected from the group consisting of: stabilizers, processing aids, internal lubricants, external lubricants, and pigments, in addition to the polymer resin, plasticizer, and filler.

In one embodiment of the present disclosure, the high hardness layer may preferably include 1 to 10 phr of the stabilizer, 50 to 300 phr of the filler, 0.1 to 10 phr of the processing aid, 0.1 to 5 phr of the internal lubricant, 0.01 to 5 phr of the external lubricant, and 0.05 to 15 phr of the pigment, more preferably, 2 to 7 phr of the stabilizer, 70 to 200 phr of the filler, 0.5 to 7 phr of the processing aid, 0.3 to 2 phr of the internal lubricant, 0.01 to 1 phr of the external lubricant, and 2 to 7 phr of the pigment.

An amount of the plasticizer included in the high hardness layer of the present disclosure is preferably in a range from 5 to 20 phr. If the amount of the plasticizer used is less than 5 parts by weight, the mechanical strength and dimensional stability are excellent, but there is a problem in that the processability is lowered. If the amount of the plasticizer exceeds 20 phr, there is a problem in that mechanical properties, dimensional stability, and eco-friendliness are lowered. The high hardness layer of the present disclosure increases its strength by reducing the content of the plasticizer, while providing the product eco-friendliness by containing less volatile organic substances. Accordingly, the tile including the high hardness layer of the present disclosure is characterized by being eco-friendly, light-weighted and high in strength compared to conventional building materials.

An amount of the stabilizer included in the high hardness layer of the present disclosure is in a range from 1 to 10 phr, and preferably 2 to 7 phr. If the amount of the stabilizer used is less than 1 phr, the thermal stability is lowered and discoloration may occur in the product, and if it exceeds 10 phr, the economic efficiency is poor.

In addition, an amount of the filler included in the high hardness layer of the present disclosure is preferably in a range from 50 to 300 phr. If the amount of the filler used is less than 50 phr, the economic efficiency is poor, and if it exceeds 300 phr, mechanical properties and processability are significantly lowered.

In particular, it is preferable that the high hardness layer has a content ratio of plasticizer and filler (plasticizer:filler) in a range from 0.02 to 0.4:1 by weight, more preferably 0.05 to 0.2:1. If the content ratio of the plasticizer and the filler exceeds 0.4:1, that is, if the plasticizer content with respect to the filler is relatively large, the strength is weak and thus an anti-transfer effect is insufficient, and if the content ratio of the plasticizer and the filler is lower than 0.02:1, that is, if the plasticizer content with respect to the filler is relatively small, there is a problem that the processability is poor.

In the case of the processing aid included in the high hardness layer of the present disclosure, it is used in an amount ranging from 0.1 to 10 phr, and preferably 0.5 to 7 phr. If the amount of the processing aid used is less than 0.1 phr, the processability deteriorates, resulting in poor surface quality of the product, and if it exceeds 10 phr, the economic efficiency is poor.

In addition, in the high hardness layer of the present disclosure, the inner lubricant is used in an amount ranging from 0.1 to 5 phr, the outer lubricant is used in an amount ranging from 0.01 to 5 phr, preferably 0.3 to 2 phr for the inner lubricant and 0.01 to 1 phr for the outer lubricant. If the amount of the internal lubricant is less than 0.1 phr, an extrusion load increases, and if it exceeds 5 phr, the economic efficiency is poor. If the amount of the external lubricant used is less than 0.01, there is a high possibility of carbide generation inside an extruder, and if it exceeds 5 phr, the external lubricant moves to the product surface, resulting in poor product properties.

In the case of the pigment included in the high hardness layer of the present disclosure, it is used in an amount ranging from 0.05 to 15 phr, and preferably 2 to 7 phr. If the amount of the pigment used is less than 0.05 phr, it is difficult to obtain the target opacity or color. If it exceeds 15 phr, the economic efficiency is poor.

In one embodiment of the present disclosure, the plasticizer includes at least one selected from the group consisting of: dioctyl phthalate (DOP), diisononyl phthalate (DINP), diisodecyl phthalate (DIDP), diundecyl phthalate (DUP), trioctyl trimellitate (TOTM), dioctyl adipate (DOA), dioctyl terephthalate (DOTP), 1,2-cyclohexane dicarboxylic acid diisononyl ester (DINCH), dipropylheptylphthalate (DPHP), acetyltributylcitrate (ATBC), vegetable plasticizer and benzoate, and preferably dioctyl terephthalate (DOTP), which is an eco-friendly plasticizer, but embodiments are not limited thereto.

In one embodiment of the present disclosure, the stabilizer includes at least one selected from the group consisting of: a metal soap-based stabilizer, an organic tin composite stabilizer and an epoxy-based stabilizer, and the metal soap-based stabilizer includes at least one selected from the group consisting of: for example, Ba/Zn, Ca/Zn and Na/Zn, and preferably an environmentally friendly Ca/Zn, but embodiments are not limited thereto.

In one embodiment of the present disclosure, the filler includes at least one selected from the group consisting of: calcium carbonate, silica, alumina, sepiolite, talc, antimony oxide, aluminum oxide, fly ash and blast furnace slag, and preferably at least one selected from the group consisting of: calcium carbonate, sepiolite, and mixtures thereof, but embodiments are not limited thereto.

In one embodiment of the present disclosure, the processing aid is used to increase a melting rate and viscosity and to improve the uniformity of the melted state and processability, includes at least one selected from the group consisting of: acrylic polymer, styrene copolymer, mineral oil, petrolatum, paraffin wax, petroleum resins, fatty acids, fatty acid esters, fatty alcohols, metal soaps, fatty acid amides, phenol resins, polyethylene, polybutene, and organic silicones, and preferably, at least one selected from the group consisting of: acrylic polymers, styrene copolymers, and mixtures thereof, but embodiments are not limited thereto.

In one embodiment of the present disclosure, when the lubricant with a thermoplastic resin is heat molded, the lubricant may be separated into the internal lubricant that lowers the viscosity of the melted resin to improve fluidity, and an external lubricant that reduces friction between the melted resin and a processing machine to reduce carbide generation and facilitates detachment from the processing machine. Typically, the lubricant is a long-chain hydrocarbon without a polar group and includes at least one selected from the group consisting of: paraffin oil; natural paraffin; polyethylene wax; fatty acids such as stearic acid and hydroxyl stearic acid; fatty acid amides such as stearic acid amide, oleic acid amide, and ercinic acid amide; fatty acid esters such as butyl stearate and glycerol monostearate; fatty acid alcohols such as cetyl alcohol, stearic alcohol; and palmityl alcohol. The internal lubricant preferably includes at least one selected from the group consisting of: fatty acid esters or fatty acid alcohols. The external lubricant preferably includes at least one selected from the group consisting of: fatty acid amides, fatty acids, and mixtures thereof. But embodiments are not limited thereto.

In one embodiment of the present disclosure, the pigment is used to improve the covering ability, and includes at least one selected from the group consisting of: organic pigments, inorganic pigments and mixtures thereof having various colors. The inorganic pigment is preferably an anatase sugar ($TiO_2$) or a rutile sugar ($TiO_2$), more preferably a rutile sugar ($TiO_2$), but embodiments are not limited thereto.

<Lower Layer>

In one embodiment of the present disclosure, the lower layer may include a polymer resin, a filler and an additive. The lower layer is seated on the floor surface and secondarily assists in preventing curling of the flooring material.

The lower layer includes at least one polymer resin selected from the group consisting of: polyethylene resin, polypropylene resin, ABS resin, polyvinyl chloride resin, acrylic resin, polyester resin, polystyrene resin, polytetrafluoroethylene, ethylene-vinyl acetate copolymer, ethylene propylene copolymer, and thermoplastic polyurethane (TPU).

The filler includes at least one selected from the group consisting of: calcium carbonate, silica, alumina, sepiolite, talc, antimony oxide, aluminum oxide, fly ash, barium sulfate and blast furnace slag.

The additive includes at least one selected from the group consisting of: plasticizers, stabilizers, pigments and flame retardants.

In addition, the lower layer may include a plurality of irregularities in a lower surface thereof. Compared to the case where the lower surface of the lower layer is famed as a planar surface, when the lower surface of the lower layer includes a plurality of irregularities, it is easy to discharge moisture or gas, and the deformation of the flooring material is effectively reduced, thereby reducing restrictions on the construction site.

A thickness of the lower layer is in a range from 0.1 to 2 mm, preferably 0.1 to 1.0 mm. If the thickness of the lower layer is less than 0.1 mm, it is not suitable for preventing curling of the flooring material, and if it exceeds 2 mm, the economic efficiency is poor.

The printed layer, the high hardness layer and the lower layer each independently include at least one polymer resin selected from the group consisting of: polyethylene resin, polypropylene resin, ABS resin, polyvinyl chloride resin, acrylic resin, polyester resin, polystyrene resin, polytetrafluoroethylene, ethylene vinyl acetate copolymer and ethylene propylene copolymer, and it is preferable that these layers use the same polymer resin.

In addition, each of the printed layer, the high hardness layer and the lower layer may further independently include one or more additives selected from the group consisting of: plasticizers, stabilizers, fillers and pigments.

OTHER ASPECTS OF THE PRESENT DISCLOSURE

Figure 2:
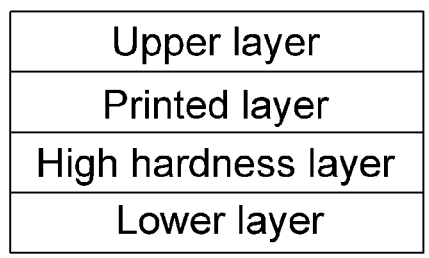
FIG. 2 illustrates a floor tile according to another embodiment of the present disclosure, where an upper layer is additionally included in the floor tile of FIG. 1.

Another aspect of the present disclosure provides a floor tile additionally including an upper layer above the printed layer (see FIG. 2). Another aspect of the present disclosure provides a floor tile additionally including one or more intermediate layer above or below the high hardness layer of FIG. 2 (see FIGS. 3A and 3B). Another aspect of the present disclosure may further include a surface coating layer above the upper layer (not illustrated). Another aspect of the present disclosure provides a floor tile additionally including an upper layer, an intermediate layer, and a dimension stabilization layer (glass fiber layer) in the floor tile of FIG. 1 (see FIGS. 4A to 4C).

Another aspect of the present disclosure provides a floor tile additionally including an upper layer, an intermediate layer, and an intermediate-lower layer in the floor tile of FIG. 1 (see FIGS. 5A to 5C)

Another aspect of the present disclosure provides a floor tile additionally including an upper layer, an intermediate layer, a dimension stabilization layer (glass fiber layer), and an intermediate-lower layer in the floor tile of FIG. 1 (see FIGS. 6A to 6D).

The bonding between each layer does not use an adhesive, and it is preferable that the printed layer and the upper layer are sequentially laminated on the high hardness layer, and that they are manufactured to be adhered to each other by performing heat fusion on each layer.

In addition, a dimension stabilization layer may be further included between the intermediate layer and the lower layer, or between the intermediate layer and the intermediate-lower layer (FIGS. 4A to 4C and FIGS. 6A to 6D).

As the dimension stabilization layer, for example, glass fiber may be used. The glass fiber layer (GF layer) serves to provide dimensional stability against heating or humidification. Examples thereof may include a glass fiber nonwoven fabric impregnated with a polyvinyl chloride resin, but embodiments are not limited thereto (FIGS. 4A to 4C and FIGS. 6A to 6D).

In addition, an anti-noise layer (not illustrated) may be additionally included below the lower layer.

Accordingly, the floor tile according to an embodiment of the present disclosure may further include, in addition to the high hardness layer serving a surface transfer prevention function, dimensional stability and anti-curling function, the surface coating layer for protecting the upper layer from the outside and preventing contamination of the surface, the upper layer for protecting the printed layer and imparting a three-dimensional effect, the printed layer for providing visual effects, the intermediate layer serving a anti-noise function and having seating properties, the lower layer seated on the floor surface and providing secondary aid in preventing curling, and the anti-noise layer capable of preventing noise transmission. The tile may have a square or rectangular plate shape, but embodiments are not limited thereto.

Hereinafter, each of these layers not described above will be described.

<Surface Coating Layer>

The surface coating layer, which is a layer for protecting a surface of the upper layer by blocking ultraviolet rays, prevents discoloration of the upper layer and the printed layer, serves to reduce, for example, damage, abrasion, and contamination effectively, and is aesthetically transparent. It may be coated with polyurethane or an acrylic resin.

<Upper Layer>

In one embodiment of the present disclosure, the upper layer is a transparent film layer that protects the printed layer from abrasion, and it is common that a three-dimensional effect may be provided by the upper layer. The upper layer may be a functional surface layer or a functional coating layer and include a polymer resin and an additive. The additive includes at least one selected from the group consisting of: plasticizers, stabilizers and UV absorbers.

In such an embodiment, a thickness of the upper layer is in a range from 0.1 to 1.2 Rut, and preferably 0.1 to 0.7 mm. If the thickness of the upper layer is less than 0.1 mm, abrasion resistance is not suitable, and if it exceeds 1.2 mm, the economic efficiency is poor.

<Intermediate Layer>

In one embodiment of the present disclosure, the intermediate layer may include a polymer resin, a filler, and an additive. The intermediate layer serves an anti-noise function to secondarily prevent noise transmission and seating properties to be seated on the floor surface with a high specific gravity, improves the elasticity of the final product and reduces the manufacturing cost. The additive includes at least one selected from the group consisting of: plasticizers, stabilizers, pigments and flame retardants.

The filler includes at least one selected from the group consisting of: calcium carbonate, silica, alumina, sepiolite, talc, antimony oxide, aluminum oxide, fly ash, and blast-furnace slag, and preferably calcium carbonate or sepiolite, but various types of known fillers may be selectively applied.

A thickness of the intermediate layer is in a range from 0.1 to 3 mm, and preferably 0.1 to 1 mm. If the thickness of the intermediate layer is less than 0.1 mm, the anti-noise effect, seating property and elasticity are insufficient, and if it exceeds 3 mm, the thickness of the entire product becomes thicker than necessary.

<Anti-Noise Layer>

In one embodiment of the present disclosure, the anti-noise layer includes a polymer resin and a filler. The polymer resin includes at least one selected from the group consisting of: polyethylene resin, polypropylene resin, acrylonitril-butadiene-styrene (ABS) resin, polyvinyl chloride resin, acrylic resin, polyester resin, polystyrene resin, polytetrafluoroethylene, ethylene-vinyl acetate copolymer, ethylene propylene copolymer, and preferably polyvinyl chloride resin, polyethylene resin or ethylene vinyl acetate copolymer resin. The filler includes at least one selected from the group consisting of: calcium carbonate, silica, alumina, sepiolite, talc, antimony oxide, aluminum oxide, fly ash, and blast-furnace slag, and preferably calcium carbonate or sepiolite, but various kinds of known resins capable of reducing stretching and noise may be selectively applied.

A thickness of the anti-noise layer is in a range from 0.3 to 2 mm, and preferably 0.5 to 1.5 mm. If the thickness of the anti-noise layer is less than 0.3 mm, the anti-noise effect is inadequate, and if it exceeds 2 mm, the economic efficiency is poor.

The polymer resin included in the high hardness layer is preferably the same as the polymer resin included in the printed layer, the intermediate layer, and the lower layer. This is because the bonding force is excellent when the resin of each layer is the same. For example, when a polyvinyl chloride resin is used in the high hardness layer, if the polyvinyl chloride resin is also used for the printed layer, the intermediate layer, and the lower layer, the two layers may be well bonded.

In addition, a plurality of irregularities may be included in the lower layer. Compared to the case where the lower layer is famed as a planar surface, when the lower layer includes a plurality of irregularities, it is easy to discharge moisture or gas, and the defamation of the flooring material is effectively reduced, thereby reducing restrictions on the construction site.

In one embodiment of the present disclosure, by introducing the high hardness layer having a high mechanical strength and excellent resistance against dimensional defamation, it is possible to prevent the transfer phenomenon in which foreign substance or irregularities on the floor surface are transferred to the surface of the flooring material and minimize curling. By minimizing the dimensional defamation, a gap does not open between the flooring materials, thereby reducing contamination and securing the ease of cleaning.

The tile according to an embodiment of the present disclosure is famed by forming the high hardness layer as a sheet through a calendering scheme, laminating the upper layer, the printed layer, the intermediate layer, and the like thereoabove and laminating the lower layer and the like therebelow in a role-to-role manner, and then performing multi-layer heat fusion or performing fusion in a heat pressing manner after lamination of each layer in multiple stages.

In one embodiment of the present disclosure, a method for manufacturing a tile according to the present disclosure, for example, a flooring material, includes: (a) preparing a printed layer and a lower layer (in some cases, an upper layer, an intermediate layer) in a calendering scheme; (b) manufacturing a high hardness layer in the form of a sheet in a calendaring scheme; and then sequentially (c) laminating the lower layer, prepared in step (a), below the sheet, and laminating the printed layer above the sheet (when the upper layer and the intermediate layer are included, the intermediate layer, the printed layer, and the upper layer are laminated in order), where heat fusion is performed for each layer.

In one embodiment of the present disclosure, steps (a) and (b) are performed at a temperature ranging from 80 to 250° C.

In one embodiment of the present disclosure, in order to manufacture the tile of the present disclosure, the high hardness layer is first prepared in the form of a sheet through a calendering scheme, and in a state that the sheet is heated to a range from 100 to 250° C., the lower layer and the printed layer (in some cases, the lower layer, the intermediate layer, the printed layer and the upper layer) are sequentially bonded therewith through a heat fusion process. Then, a liquid raw material for surface coating is coated on the upper layer, and the surface is cured using an ultraviolet irradiation device, and hence the surface coating layer is fabricated.

Specifically, the separated constituent layers each are laminated continuously and sequentially by the heat fusion process. Firstly, after the lower layer is heated to a temperature ranging from 80 to 250° C. through an infrared heater and a heating drum, it is laminated, using a press roll, with a lower surface of the high hardness layer that is horizontally transferred through a conveyor. Next, the printed layer that has been heated to a temperature ranging from 80 to 250° C. through an infrared heater and a heating drum is laminated, using a press roll, with an upper surface of the sheet. In a case where the intermediate layer and the upper layer are included, the intermediate layer is firstly laminated on the upper surface of the sheet by a press roll, and then in the same manner, the printed layer and the upper layer are sequentially laminated on the intermediate layer. The semi-finished product of the laminated tile undergoes a surface coating-layer treatment process and then a cooling process, cut to a predetermined size, and is completed as a product.

As described above, the method for manufacturing a tile of the present disclosure is a method that does not use an adhesive. Conventionally, when manufacturing a tile of a multi-layered composite structure, in particular, a flooring material, a process of laminating and bonding each layer having different materials or properties is included, and in such a case, a bonding/pressing scheme in which a liquid adhesive is applied between each layer in order to obtain sufficient interlayer bonding, each layer is laminated and pressed, and then the adhesive is cured for solidification is largely used. In this method, a process of applying an adhesive and a curing process are added, and an intermittent pressing process is performed, and hence the production process is complicated and the process time increases, thereby lowering the production efficiency of the manufacturing process.

However, in the present disclosure, since each layer is bonded by a heat fusion scheme without using an adhesive, the bonding process may be performed continuously, not intermittently. This allows excellent productivity.

In addition, there has been a risk that the surface of the product is contaminated due to excessive use of the adhesive, and substances harmful to the human body may be generated due to volatile organic compounds after the flooring material is laid. In this regard, a method of concurrently heat-fusing each layer of a multi-layer composite structure tile at a time has been used so as to increase the production efficiency of the bonding/pressing scheme, but there are disadvantages that a peel strength between each layer is lowered, and when the manufacturing process conditions are not thoroughly managed, dimensional stability becomes unstable.

In the present disclosure, since the finished tile does not contain an adhesive, dimensional stability is excellent, and contamination and appearance defects due to the adhesive may be reduced.

Hereinafter, the present disclosure will be described in more detail through examples. These examples are only intended to illustrate the present disclosure more practically, and it will be apparent to those skilled in the art that the scope of the present disclosure based on the gist of the present disclosure is not limited by these examples.

INVENTIVE EXAMPLE

Inventive Example 1

Each layer forming the floor tile was prepared by a calendering scheme. Corresponding components of each layer as shown in Table 1 below were mixed in the composition ratio as shown in Table 1 below, and the mixed raw material was primarily gelled uniformly by heating and pressing, and then secondarily gelled by an extruder or a mixing roll.

TABLE 1

| Classification | Upper layer | Printed layer | High hardness layer | Lower layer |
| --- | --- | --- | --- | --- |
| PVC | 100 | 100 | 100 | 100 |
| Filler | 0 | 20 | 100 | 60 |
| Plasticizer | 25 | 10 | 10 | 30 |
| Others | Suitable quantity | Suitable quantity | Suitable quantity | Suitable quantity |

[Unit: Parts by Weight]

Next, the mixture was put into a calender roll and completely gelled, and then a semi-finished product in the foil of a sheet was manufactured through a calendering process. The semi-finished product was wound in a roll form, and then placed on a continuously rotating conveyor in-line according to the lamination order, and each layer was sequentially heat-fused. Specifically, each layer wound in the form of a roll was supplied into the conveyor in-line, while being pre-heated with an infrared heater and a heating drum, and then, while passing through a press roll, each layer was sequentially laminated one by one through heat fusion so that with respect to the high hardness layer, the lower layer was beneath the high hardness layer, the printed layer was on the high hardness layer, and the upper layer was on the printed layer. After the tile that had been integrated with high temperature heat and pressure was cooled through a cooling process, it was firstly cut to an appropriate size, and internal stress was removed through an annealing process. A photocurable resin such as a urethane acrylate-based resin was applied on the upper layer of the cut tile and cured with ultraviolet rays to form a surface coating layer, and then the tile was secondly cut to a desired predetermined size to produce a multilayer floor tile.

Comparative Examples 1 and 2

The upper layer, the printed layer, and the lower layer were prepared with the same components and the same mixing ratio as in Table 1 above. Specifically, the corresponding components of each layer were press-kneaded using a mixer, heat-kneaded with a mixing roll, and then famed into a sheet using a calender roll. On the other hand, the high hardness layer was prepared into a sheet using a calender roll with the composition shown in [Table 2] below. Each molded sheet was heat-pressed to produce a multilayer floor tile.

TABLE 2

| Classification | Inventive Example 1 | Comparative Example 1 | Comparative Example 2 |
| --- | --- | --- | --- |
| PVC | 100 | 100 | 100 |
| Filler | 100 | 100 | 300 |
| Plasticizer | 10 | 30 | 30 |
| Others | Suitable quantity | Suitable quantity | Suitable quantity |

[Unit: Parts by Weight]

Experimental Example 1

Surface Transfer Phenomenon Examination

In order to examine the degree of surface transfer of the tiles of Inventive Example 1 and Comparative Examples 1 and 2, a wave patterned hera stain was famed on an area of 1000*1000 size for each product, and then the tiles were laid on the floor, and then whether the stain is transferred to the surface was determined. The results are shown in Table 3 below.

TABLE 3

| Classification | Inventive Example 1 | Comparative Example 1 | Comparative Example 2 |
|---|---|---|---|
| Surface transfer | None | Partially | Distinctively recognized |

According to Table 3, it was confirmed that the surface transfer phenomenon of Inventive Example 1 was improved compared to Comparative Examples 1 and 2.

Experimental Example 2

Dimensional Stability Examination

In order to examine the dimensional stability of the tiles of Inventive Example 1 and Comparative Examples 1 and 2, each product was heated at 80° C. for 6 hours and then cooled at room temperature for 1 hour, according to the test method for length change by heating pursuant to KS M 3802, and a dimensional change rate of each product in longitudinal and transverse directions was measured. The results are shown in Table 4 below. Herein, the lower the dimensional change rate value, the better the dimensional stability.

TABLE 4

| Classification | | Inventive Example 1 | Comparative Example 1 | Comparative Example 2 |
|---|---|---|---|---|
| Dimensional change rate (%) | Length | 0.08 | 0.11 | 0.10 |
| | Width | 0.06 | 0.09 | 0.08 |

According to Table 4, the dimensional stability of Inventive Example 1 was found to be superior to Comparative Examples 1 and 2.

Experimental Example 3

Examination of Anti-Curling Properties (Curling Stability)

In order to determine the anti-curling properties of the tiles of Inventive Example 1 and Comparative Examples 1 and 2, each product was heated at 80° C. for 6 hours and then cooled at room temperature for 1 hour, according to the curling measurement method pursuant to ISO 23999, and then the degree of curling of each flooring material was measured based on the initial product condition. The results are shown in Table 5 below.

TABLE 5

| Classification | Inventive Example 1 | Comparative Example 1 | Comparative Example 2 |
|---|---|---|---|
| Curling degree (mm) | 0.3↓ | 0.5↓ | 0.5↓ |

Herein, a lower degree of curling indicates better anti-curling property. According to Table 5, the anti-curling properties of Inventive Example 1 were found to be superior to Comparative Examples 1 and 2.

Experimental Example 4

Residual Indentation

In order to examine the indentation of the tiles of Inventive Example 1 and Comparative Examples 1 and 2, each tile was cut to a size of 50*50 according to the test method for length change by heating pursuant to KS M 3802, a load of 356 N was then applied for 10 minutes with a flat steel bar at room temperature, and then, 60 minutes after removing the load, the indentation amount was measured and the residual indentation was calculated. The results are shown in Table 6 below.

TABLE 6

| Classification | Inventive Example 1 | Comparative Example 1 | Comparative Example 2 |
|---|---|---|---|
| residual indentation (%) | 0.2 | 0.3 | 0.3 |

The residual indentation should have a performance of 8% or less.

According to Table 6, Inventive Example 1 showed superior residual indentation as compared to Comparative Examples 1 and 2.

The invention claimed is:

1. An anti-transfer floor tile, comprising: a printed layer, a high hardness layer, and a lower layer,
wherein the high hardness layer comprises at least one polymer resin selected from the group consisting of: polyethylene resin, polypropylene resin, ABS resin, polyvinyl chloride resin, acrylic resin, polyester resin, polystyrene resin, polytetrafluoroethylene, ethylene-vinyl acetate copolymer, ethylene propylene copolymer, thermoplastic polyurethane (TPU), and
the high hardness layer comprises a plasticizer in an amount ranging from 5 to 20 phr and a filler in an amount ranging from 50 to 300 phr.

2. The anti-transfer floor tile of claim 1, wherein the high hardness layer has a plasticizer and filler content ratio (plasticizer:filler) in a range from 0.02 to 0.4:1 by weight.

3. The anti-transfer floor tile of claim 1, wherein a specific gravity of the high hardness layer is in a range from 1.5 to 2.5.

4. The anti-transfer floor tile of claim 1, wherein the polymer resin included in the high hardness layer is the same as polymer resins included in the printed layer and the lower layer.

5. The anti-transfer floor tile of claim 1, wherein each layer is bonded without an adhesive.

6. The anti-transfer floor tile of claim 1, further comprising an intermediate layer on the lower layer and an upper layer on the printed layer.

7. The anti-transfer floor tile of claim 1, further comprising an anti-noise layer below the lower layer.

8. The anti-transfer floor tile of claim 6, further comprising a dimension stabilization layer between the lower layer and the intermediate layer, or between the intermediate layer and the printed layer.

9. The anti-transfer floor tile of claim 6, further comprising a surface protection layer on the upper layer.

10. The anti-transfer floor tile of claim 1, wherein each layer is bonded by heat fusion.

* * * * *